United States Patent [19]

Bohn et al.

[11] Patent Number: 5,556,340

[45] Date of Patent: Sep. 17, 1996

[54] AMUSEMENT RIDE ASSEMBLY WITH ROTATING TUBE SYNCHRONIZED WITH AN IMAGE

[75] Inventors: William R. Bohn, Granada Hills; Shelly Short, Pasadena; Joseph O. Garlington, La Crescenta, all of Calif.

[73] Assignee: The Walt Disney Company, Burbank, Calif.

[21] Appl. No.: 519,483

[22] Filed: Aug. 25, 1995

[51] Int. Cl.$^6$ .................................................. A63G 31/16
[52] U.S. Cl. .................................. 472/59; 472/60; 472/44
[58] Field of Search .............................. 472/59, 60, 61, 472/44, 45, 130, 135; 434/55, 57, 30, 34

[56] References Cited

U.S. PATENT DOCUMENTS

| | | |
|---|---|---|
| 1,097,627 | 5/1914 | Hale . |
| 1,833,540 | 11/1931 | Scott et al. . |
| 1,844,852 | 2/1932 | Harvey . |
| 3,542,934 | 11/1970 | Wyener et al. . |
| 3,933,326 | 1/1976 | Schauffler . |
| 4,066,256 | 1/1978 | Trumbull . |
| 4,251,140 | 2/1981 | Fogerty, Jr. . |
| 4,303,236 | 12/1981 | Czarnecki . |
| 4,477,069 | 10/1984 | Crudgington, Jr. . |
| 4,798,376 | 1/1989 | Trumbull et al. . |
| 4,856,771 | 8/1989 | Nelson et al. . |
| 4,879,849 | 11/1989 | Hollingsworth, III et al. . |
| 5,009,412 | 4/1991 | Roodenburg et al. . |
| 5,282,772 | 2/1994 | Ninomiya et al. . |

Primary Examiner—Kien T. Nguyen
Attorney, Agent, or Firm—Hecker & Harriman

[57] ABSTRACT

An amusement ride attraction, with a rotating tube and an image is disclosed that is, relatively inexpensive and compact. The viewer stands inside the rotating tube, and the forces applied to the viewer are in automatic synchronization with the projected image. This creates an illusion that the person is moving in a moving vehicle, thereby resulting in a feeling of motion and a simulated experience of participating in the activity. The cylinder is rotated in a clockwise or counterclockwise direction in synchronization with movements of the projected image showing a "rider's eye" view from a moving motorcycle, airplane, car, or the like.

9 Claims, 17 Drawing Sheets

FIG. 7a(ii)

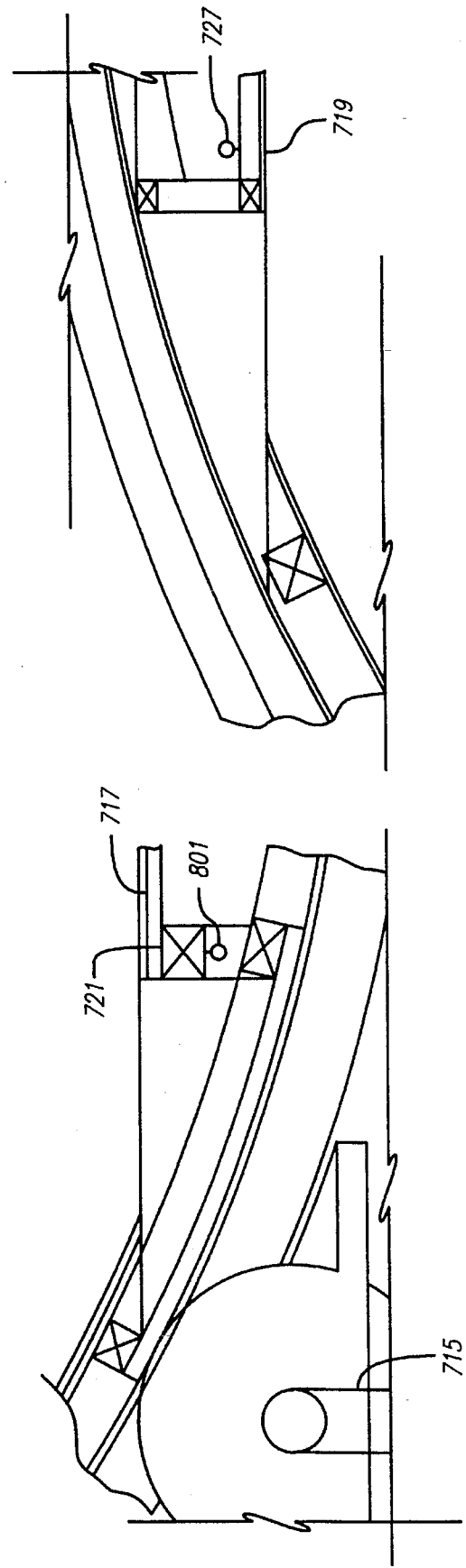

AMUSEMENT RIDE ASSEMBLY WITH ROTATING TUBE SYNCHRONIZED WITH AN IMAGE

BACKGROUND OF THE INVENTION

1. Field of the Invention

The present invention relates generally to the field of amusement park attraction apparatus. In particular, this invention relates to a ride assembly especially adapted for rotational movement, wherein a cylinder is rotated within an enclosure in either a clockwise or counterclockwise direction in synchronization with movements in a projected image showing a "rider's eye" view from a moving motorcycle, airplane, car, etc. The result is a feeling of motion and a simulated experience of doing the projected activity.

2. Brief Description of the Prior Art

Apparatuses presently utilized in amusement park attractions range from inexpensive and simple observation systems, based on motion pictures exhibiting visually stimulating scenery, to expensive and sophisticated flight simulators. In the simple systems, a chamber containing a viewer slowly moves resulting in the viewer feeling an illusion of motion. The viewer may be stationed in a chamber propelled in a gondola, a train, a boat or a submarine, riding along a trackway. Most sophisticated systems include complex computer-assisted simulation apparatuses for flying or driving. These systems comprise a platform located on hydraulic actuators with three or more degrees of freedom that tilt the platform or move it up and down; the movements may include simultaneous pitch, roll, and yaw as well as ascent and descent.

A number of patents describe prior art systems as follows.

An amusement apparatus is disclosed in U.S. Pat. No. 1,097,627 issued to G. C. Hale on May 26, 1914, for exhibiting pictures taken from towers, mountain tops, balloons, etc., so that a user may view scenery at a low altitude that is ordinarily observed at high altitudes. The apparatus of Hale includes an elevator/reception room, an observatory/auditorium, an endless translucent belt positioned next to the reception room, view screens for the observatory, and means for projecting views and scenery on the various screens and the belt.

Another amusement device is disclosed in U.S. Pat. No. 1,833,540 issued to D. H. Scott et al. on Jun. 16, 1931. A passenger car is propelled along a trackway within an enclosure for maintaining darkness along the trackway where effect apparatuses are arranged along the trackway within the enclosure. The device of Scott et al., includes a trackway passing through a cylindrical tube that has luminescent stars painted on a black background in the inner surface of the cylinder. A passenger car propelled along the trackway passes through the cylinder as the cylinder rotates for giving a passenger "the illusion of moving, as revolving, in infinite space."

Yet another amusement device for simulating flight in the cabin of a passenger-carrying aircraft is disclosed in U.S. Pat. No. 1,844,852 issued to S. T. Harvey on May 13, 1929. In this device, a theater is constructed to resemble an aircraft cabin having a floor that is moved in a predetermined manner to simulate flying. A motion picture is displayed at the front of the theater taken of actual flying. A "pilot" at the front of the theater manipulates controls of the "would-be" airplane and airplane wings are disposed about the pilot. Wind effects and droning noise are also produced.

A submarine simulator is disclosed in U.S. Pat. No. 3,542,934 issued to J. S. Warhurst et al. on Mar. 6, 1968, that includes an environmental tank, a cab simulating a submersible vehicle, and an optical system for unprogrammed training in underwater navigation and reconnaissance.

An observation/interpretation system is disclosed in U.S. Pat. No. 3,933,326 issued to Schauffler on Jan. 20, 1976, that includes a lighter-than-air vehicle having a gondola that is maintained in a fixed position. The gondola includes an observation window and audio and olfactory accompaniment. A projection device projects images on a curved screen below the vehicle to simulate flight when viewed from the gondola.

An amusement ride creating the illusion that a passenger is seated in a rapidly maneuvering vehicle is disclosed in U.S. Pat. No. 4,066,256 issued to Douglas Trumbull on Jan. 3, 1978. The ride includes a passenger-holding frame having three locations resting on hydraulic rams for tilting the frame or moving it up and down. It further includes a film projector and viewing screen connected to the frame that moves with the frame. The rams tilt the frame to simulate forces of a moving vehicle in a motion picture displayed on the viewing screen.

A ride assembly for simulating travel is disclosed in U.S. Pat. No. 4,251,140 issued to R. W. Fogerty, Jr. on Feb. 17, 1981, that includes a housing having a moveable base adapted for carrying seated passengers, a pair of supporting carriage members with the base fixedly mounted to a lower carriage member, a motion picture projector and sound system for projecting a sound motion picture on a spherical inner surface of the housing. The housing is mounted on the base to move with it. Motors independently drive the pair of supporting carriage members.

A trip motion simulator is disclosed in U.S. Pat. No. 4,303,236 issued to Czarnecki on Dec. 1, 1981, comprising a capsule for holding seated people that is mounted on a supporting structure. The supporting structure includes pitch and roll cradles to space the capsule from a floor or base surface and having drive mechanisms for "rockably" actuating the cradles to move the capsule. A movie screen may be located at the front of capsule for displaying projected images.

An electronic amusement center for a multiple number of consoles that are connected to a master computer system is disclosed in U.S. Pat. No. 4,477,069 issued to C. B. Crudgington, Jr. on Oct. 16, 1984. Each console contains a variety of controls for regulating movement in a computer simulated environment and is operated by one or more participants. The computer simulated environment is shared by all the participants. The consoles also contain displays that show each participant moving in the simulated environment.

An amusement ride apparatus with a plurality of individually tiltable frames for moving and tilting seated passengers viewing a motion picture is disclosed in U.S. Pat. No. 4,798,376 issued to Douglas Trumbull et al. on Jan. 17, 1989. The plurality of individually tiltable frames are all moved in synchronism, each by a separate set of actuators. The passenger holding frame is pivoted up and down on a beam supported by two largely vertical actuators while two pairs of links limit movement of the beam.

A video simulation machine for simulating various movements, such as flying or driving is disclosed in U.S. Pat. No. 4,856,771 issued to D. R. Nelson et al. on Aug. 15, 1989. The machine comprises a simulated cockpit of an airplane or other vehicle wherein one or two persons may recline or be seated containing movement controls and a monitor for displaying simulated pictures responsive to the movement controls. The controls include a joystick control and a foot control. The machine simulates movements including simultaneous pitch, roll, and yaw as well as ascent and descent. The rotating parts of the simulator are driven by electric motors that are controlled by both the operator and a computer.

A point-of-view motion simulator system is disclosed in U.S. Pat. No. 4,879,849 issued to Fred Hollingsworth, III et al. on Nov. 14, 1989, that comprises three coordinated components or sub-systems. The first sub-system consists of seats, rods, bearings and hydraulic cylinders for mechanically conveying participants occupying the seats. The second sub-system located in the hydraulic circuit for converting electrical signals for the mechanical system. The third sub-system is the electrical circuitry incorporating a projector for projecting a moving image on a screen to produce a series of motion signals to individually move the seats according to motion in the point-of-view film.

An earthquake simulator for a theme park that provides an earthquake sensation to a large group of people (e.g., twenty-five to sixty persons) is disclosed in U.S. Pat. No. 5,009,412 issued to Joop Roodenburg et al. on Apr. 23, 1991. The earthquake simulator comprises a platform having seats for the plurality of people and three hydraulic cylinders are attached to the platform and the underframe for providing three degrees of freedom. The hydraulic cylinders are part of a hydraulic circuit controlled by a microprocessor.

A simulator for shooting down the rapids is disclosed in U.S. Pat. No. 5,282,772 issued to Shazo Ninomiya et al. on Feb. 1, 1994. A platform is installed on one side of a water channel in which a boat moves and a theater zone is installed on the other side. In the theater zone, a boat swaying device and a wind generating device are installed that are operated in synchronization with a picture projected on a screen in the theater by a projector. The boat is swayed in synchronization with the projected picture.

SUMMARY OF THE INVENTION

The present invention provides an amusement ride with a projected image, wherein a viewer is positioned inside a rotating tube, and where the forces applied to the viewer are coordinated with the image, resulting in a feeling of motion and in a simulated experience of participating in the activity. The present invention may be used, for example, in amusement parks. In an alternate embodiment of the invention, the viewer is in an interactive relationship with the image. In this embodiment, the viewer attempts to initiate rolling motion in a clockwise or counterclockwise direction to coordinate with the view in the image.

BRIEF DESCRIPTION OF THE DRAWINGS

FIG. 7A (ii) shows detailed drawings of a touchplate located in section 701 of FIG. 7A (i);

FIGS. 8A, 8B and 8C are sectional views of the details of the apparatus of FIG. 4, in accordance with another embodiment of the present invention.

DETAILED DESCRIPTION OF THE INVENTION

In the following description, numerous specific details are set forth in order to provide a more thorough description of the invention. It will be apparent, however, that the present invention may be practiced without these specific details. In other instances, well known features have not been described in detail so as not to unnecessarily obscure the present invention.

The present invention relates to an amusement ride which provides forces to the human body during the ride motion, for use, for example in an amusement park. The entertainment is enhanced by providing "rider's eye" view images that simulate the view from a rapidly moving vehicle, such as maneuvering airplane, motorcycle or race car. The view is synchronized with the forces applied to the visitors, giving the spectators the impression that they are riding in the moving vehicle.

Figure 1:
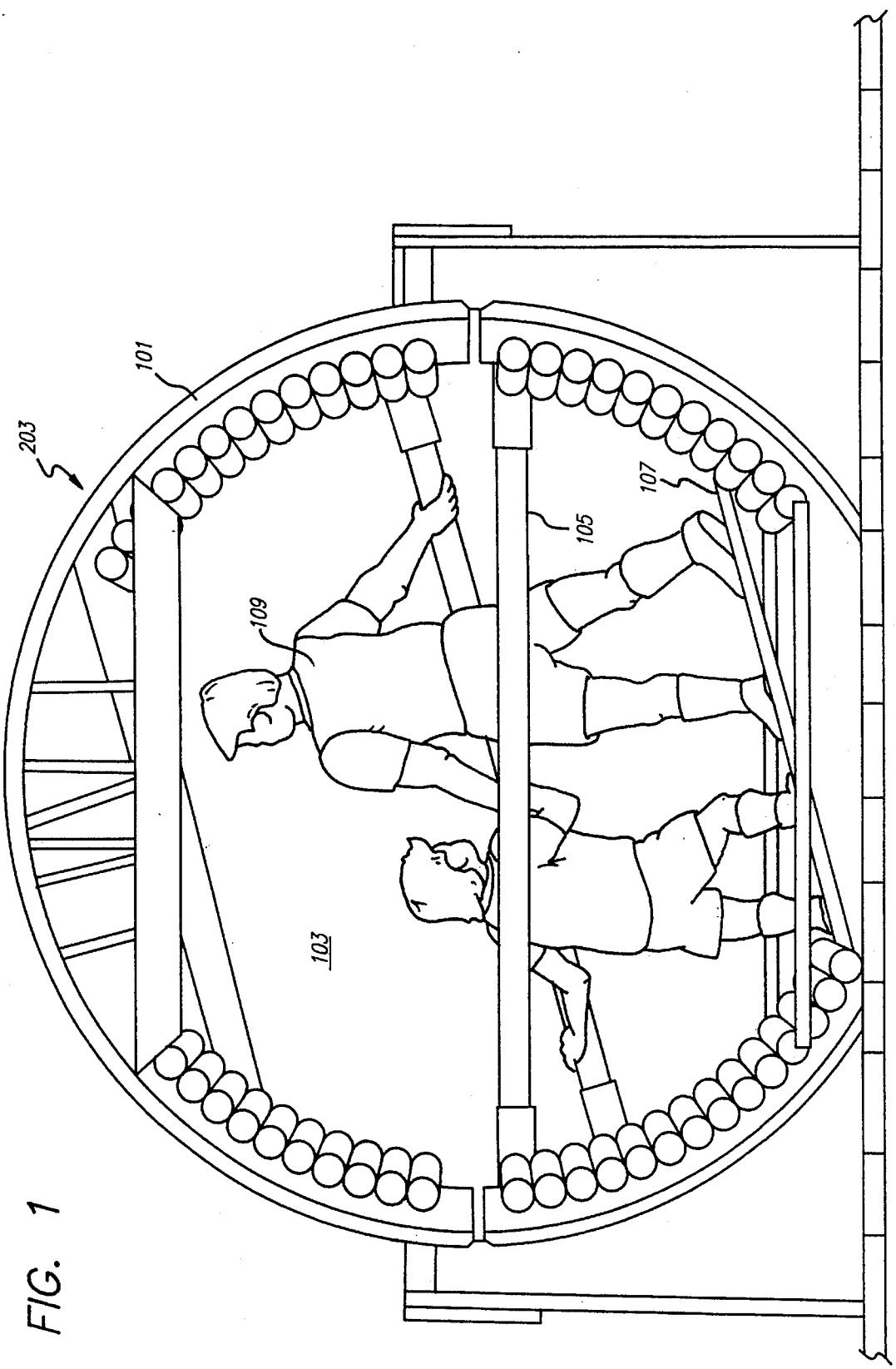
FIG. 1 is an illustrative embodiment of the ride assembly with a cylinder showing external end view of the cylinder in both starting and rotated position, in accordance with one embodiment of the present invention.
Figure 2:
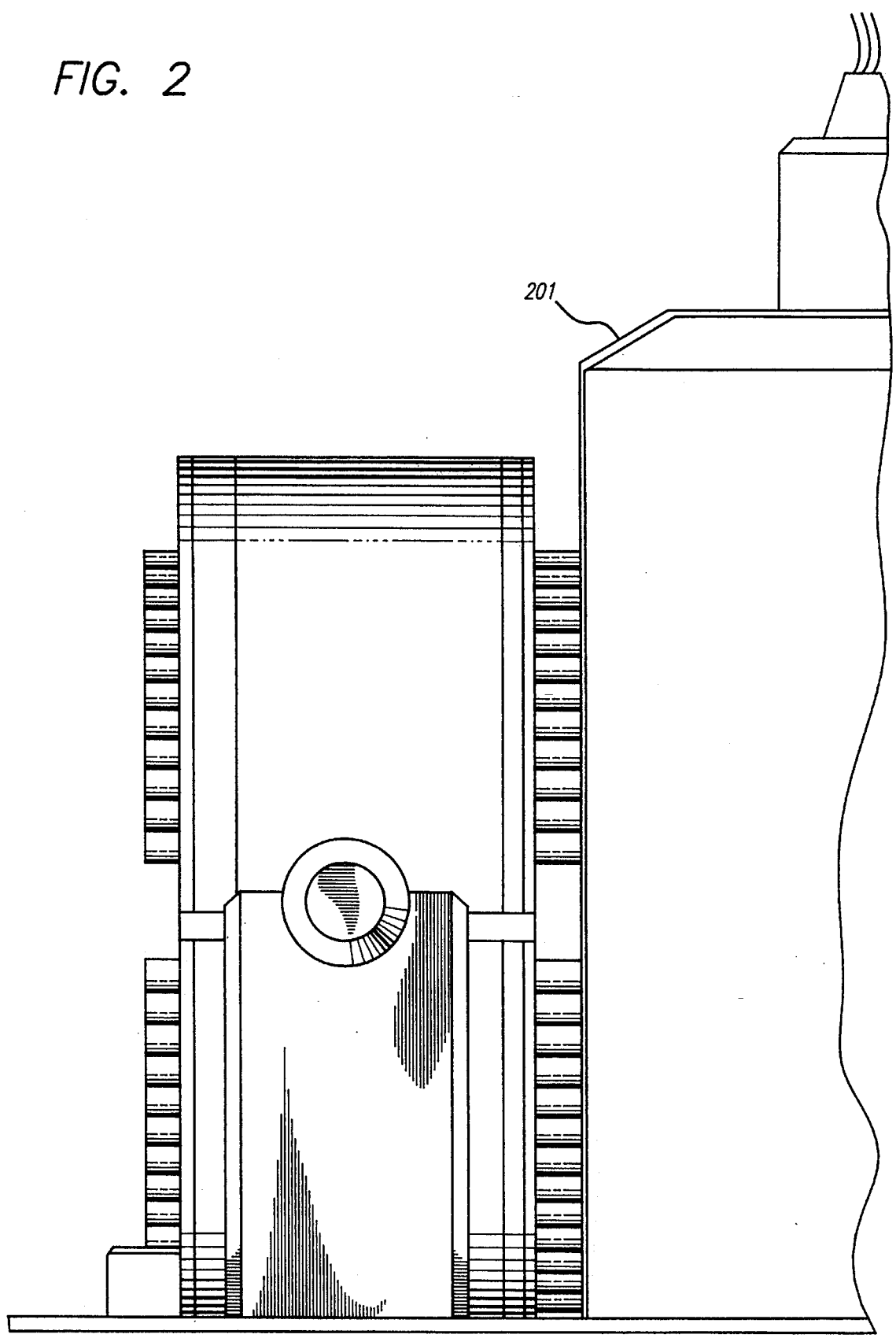
FIG. 2 is a side elevational view of the apparatus of FIG. 1, in accordance with one embodiment of the present invention.
Figure 3:
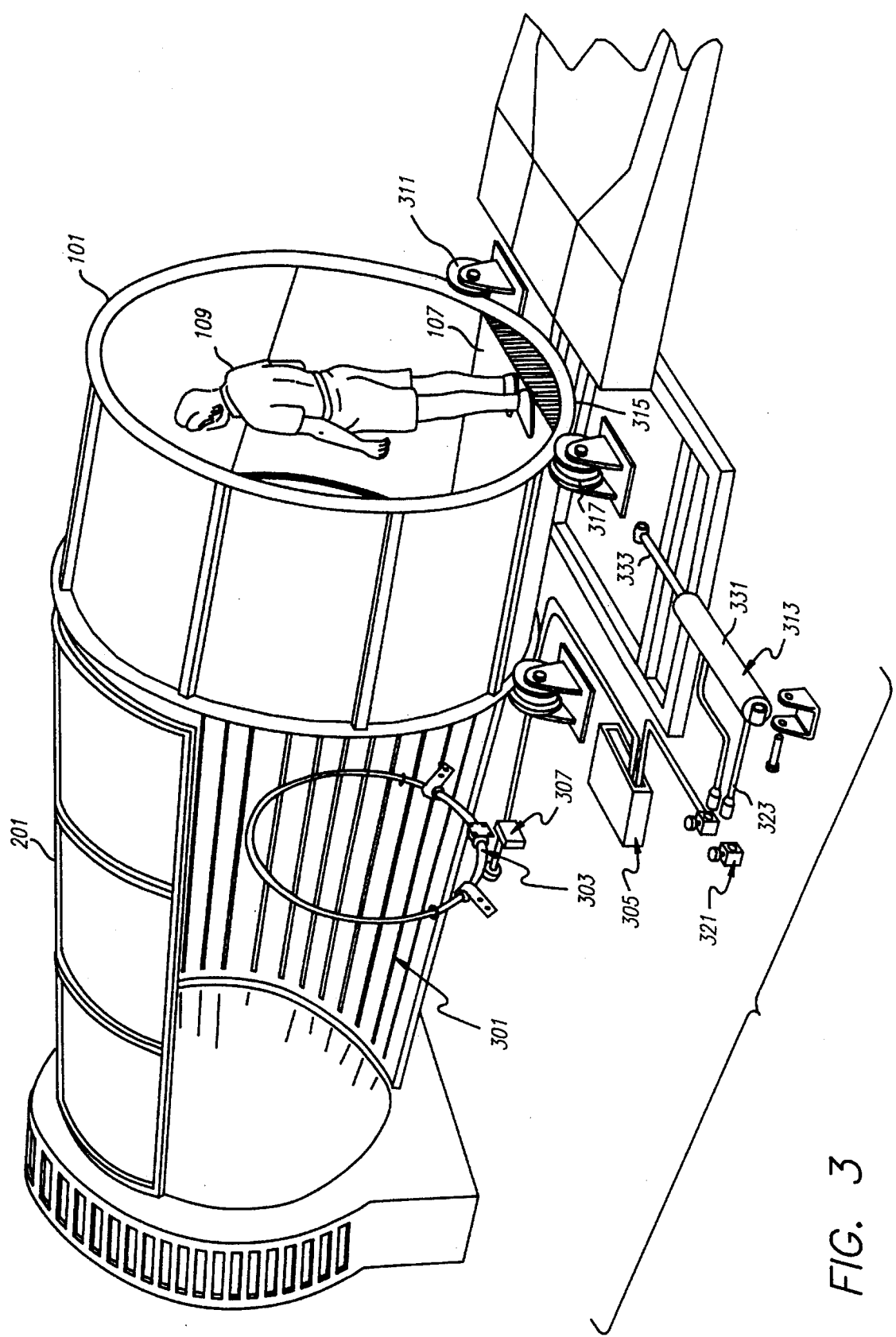
FIG. 3 is a perspective view of the apparatus of FIG. 1, partially broken away to show details of the construction, in accordance with one embodiment of the present invention.

In accordance with one embodiment of the present invention, in a ride apparatus for making an audio-visual presentation to simulate travel in a preprogrammed environment, as shown in FIGS. 1–3, the ride apparatus is generally cylindrical in shape and is adapted for rolling movement. The ride may be set up upon level ground, requiring no particular construction, or on a specially built supporting structure. The apparatus embodies a stationary tube 201 with a circular rear projection screen 103 at one end, and a rotating cylindrical member 101, adjacent to the stationary tube's 201 other end, with a platform floor 107 for standing and a safety railing 105 positioned in front of the visitor. The platform floor 107 of the cylindrical member 101 is elevated and fixedly mounted about the outer periphery of the cylindrical member 101 to move forthwith, such as by bolts, not shown. The platform floor 107 of the cylindrical member 101 is low and minimizes sway and vibration when the ride is in use, due to its low center of gravity. Further, the platform floor 107 minimizes likelihood of injury as the spectators negotiate the step to enter the ride.

A viewer 109 faces forward towards a rear projection screen 103. An image generating means, such as a motion picture projector, not shown, is provided to project a motion picture image on the projection screen 103, in order to enhance the entertainment effect. The cylindrical member 101 is operated to rotate simultaneously to synchronize with the image as it depicts a vehicle ride, giving the impression and thereby causing a sensation that the viewer 109 is riding in the projected vehicle. The interior of the stationary tube 201 and the cylindrical member 101 is maintained dark, whereby the senses of space, direction and location become confused, adding to the impression that the viewer 109 is within a vehicle in which rotation is a natural movement.

Equipment for projecting an action scene on the exterior screen surface is well known in the art and does not need to be described here or be shown in detail. The audio-visual presentation system may include a motion picture projector, not shown, and a rear projection screen 103. The image display means stays in a fixed position. In some instances, when the image depicts relative movement between an object and the background, the viewer 109 could more realistically experience the scene if he/she experienced the sensation of vertical and back-and-forth movement while simultaneously viewing the image.

The present invention includes a suitable supporting structure and a drive mechanism for the cylindrical member 101 which is capable for moving the cylindrical member's 101 body in side-to-side rolling movement, as required by the particular action of the scene being viewed by the spectator. This rolling movement, caused by the platform 107 to tilting so as to simulate the slight rocking of an airplane while flying or a vehicle during a ride, is felt by the persons standing in the cylindrical member 101.

The means for rotating the cylindrical member 101 may comprise any suitable or desired mechanism. In one illustration of the preferred embodiment, the cylindrical member 101 is mounted and supported on its periphery upon four load wheels 311, to be driven about its axis by an actuator which causes the entire cylindrical member 101 to revolve. The load wheels 311 engage and guide the cylindrical member 101 to maintain proper alignment of the cylindrical member 101 in its rolling movement. The cylindrical member 101 is of sufficient diameter that a viewer of any size may stand comfortably in the circular enclosure with ample clearance for swaying either left or right during the rolling movement. The inner surface of the cylindrical member 101 includes a platform floor 107 having a non-skid surface. To prevent the platform floor 107 from tilting at too much of an angle, a safety railing 105 is disposed in front of the spectator. Cylindrical member 101 is guided by the cylindrical member's rim 315, in engagement at all times with the load wheels 311 guide groove 317, so that there is no slack or lost motion which would jerk the cylindrical member 101 when the direction of rotation is reversed. Rolling movement in each direction may be limited by two stops, not shown, at each side of the lower end of the cylindrical member 101.

Rotation of the cylindrical member 101 about one horizontal axis in either direction is accomplished by an actuator which prevents pitch and yaw pivoting about the vertical and horizontal axis. One embodiment of the actuator, illustrated in FIG. 10, is an electric motor driving a gear 905 that engages a toothed belt 1002 mounted on the device.

Figure 10:
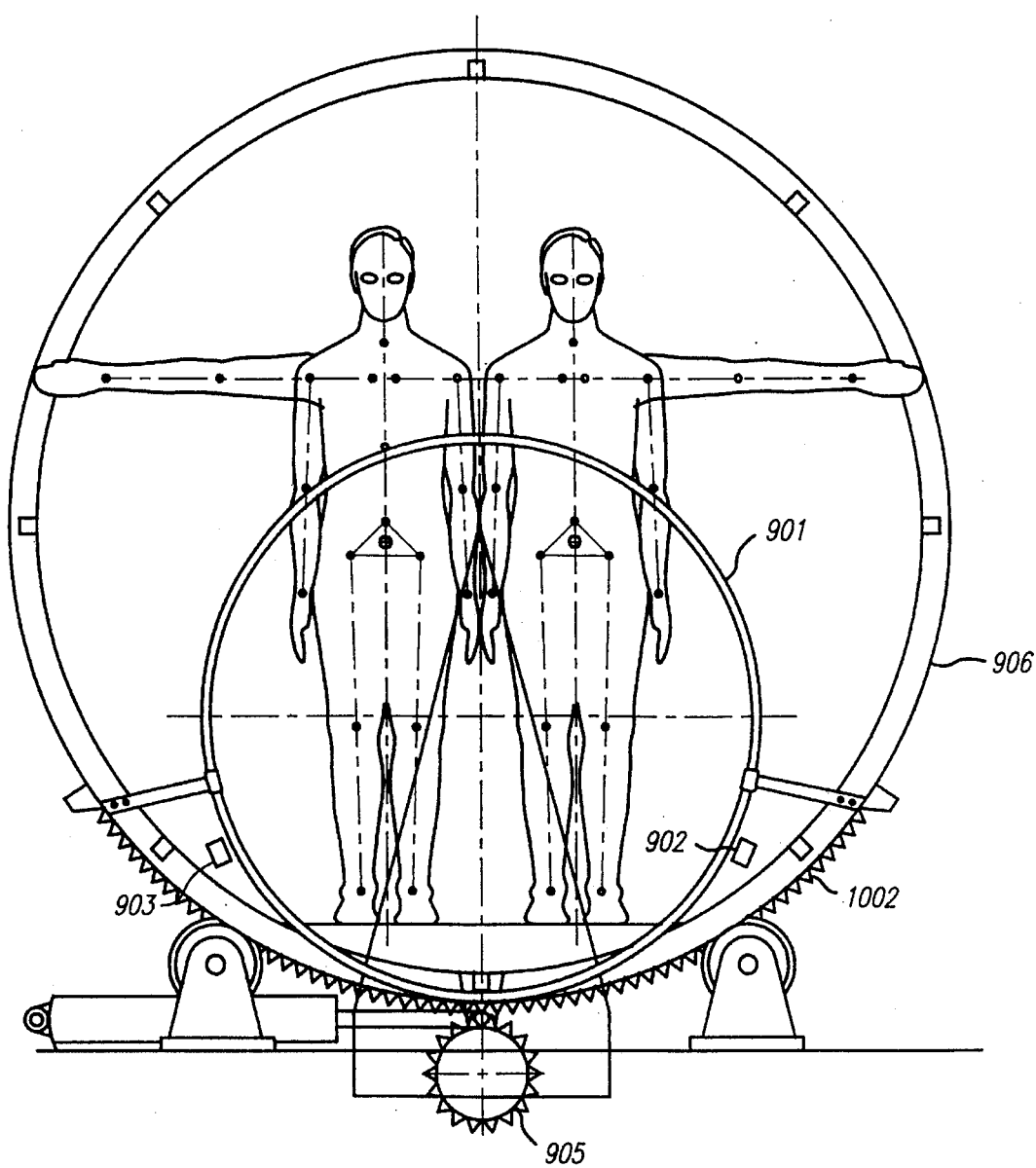
FIG. 10 illustrates an alternate drive mechanism of the present invention.

As illustrated in FIG. 10, the actuator is an electric drive motor 905 mounted adjacent the cylinder 101. The motor engages a toothed belt 1002 mounted on cylinder 101. The toothed belt 1002 may be a so called "Gilmer" belt, poly chain, or any other engageable geared or toothed surface. Alternatively, the teeth and/or gears may be integrally formed in the cylinder 101 itself. The motor is stationary but as it rotates it drives the toothed belt and correspondingly, the motion base tube.

Figure 11:
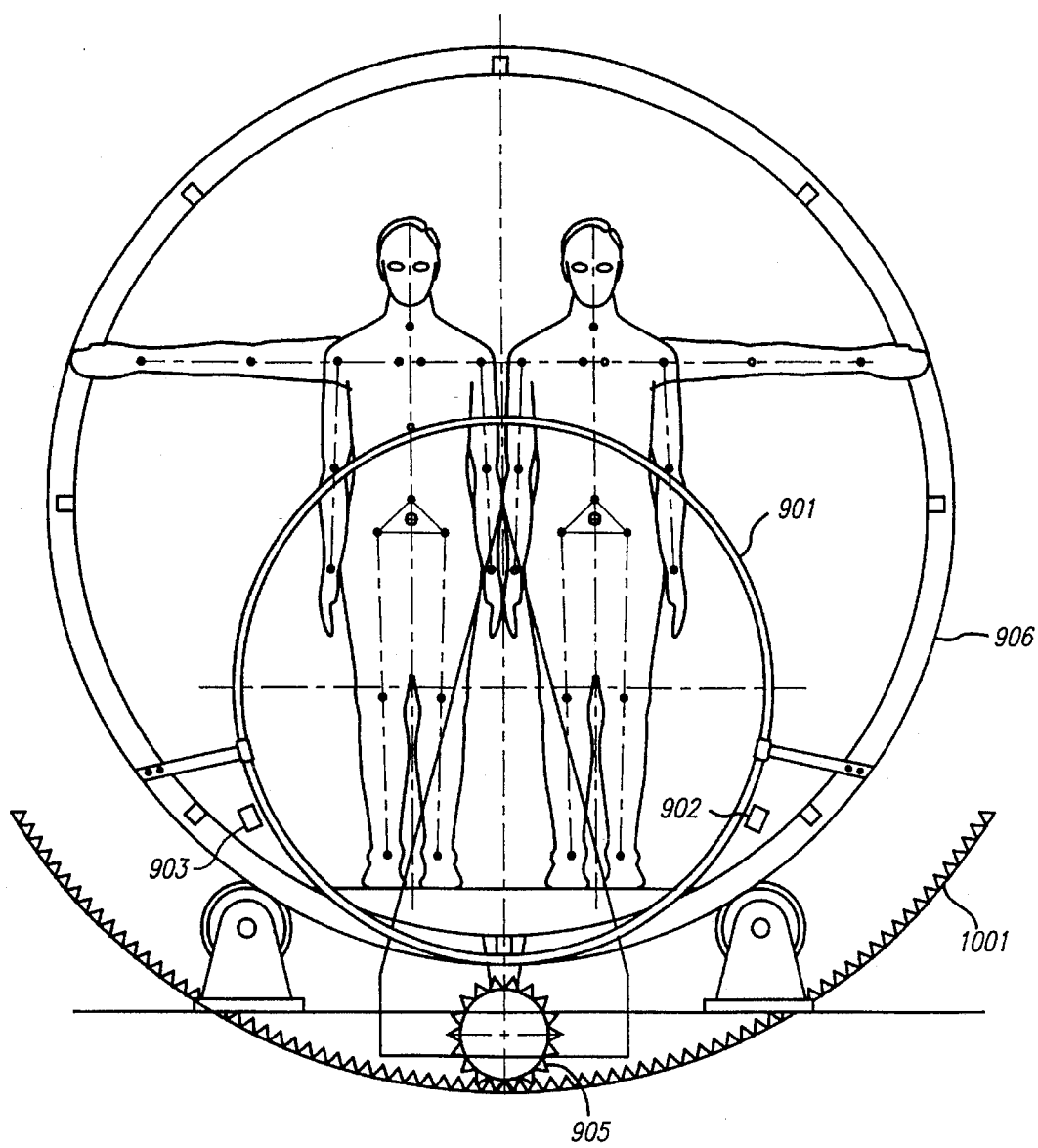
FIG. 11 illustrates another alternate drive mechanism of the present invention.

FIG. 11 is a drawing illustrating an alternate embodiment of the present invention. In FIG. 11, a motor or rotary actuator is coupled to sprocket 905, which engages toothed arcuate member 1001. Toothed arcuate member 1001 has a radius of curvature that maintains concentricity with cylinder 101.

Figure 12:
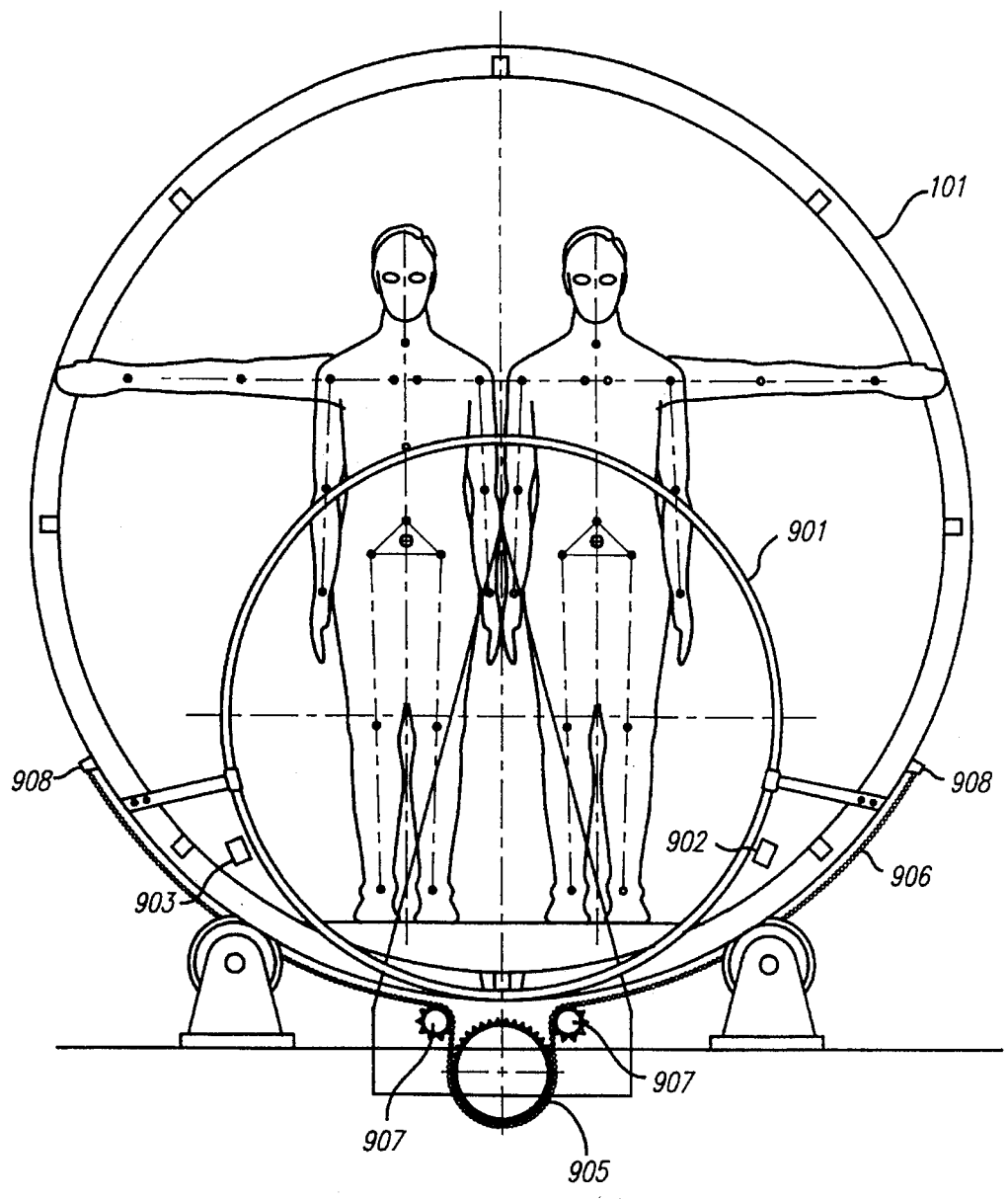
FIG. 12 illustrates the preferred embodiment of the present invention.

FIG. 12 illustrates the preferred embodiment of the invention. In FIG. 12, a motor or rotary actuator, preferably an electric motor, is coupled to sprocket 905, which engages belt 906. Alternatively, other well known types of actuators may be used to induce motion in sprocket 905. Belt 906 is mounted on cylinder 101. Preferably, belt 906 is wrapped around at least a portion of the circumference of cylinder 101, with the ends of belt 906 secured to cylinder 101 by mounts 908. Belt 906 engage idler sprockets 907, which ensure that belt 906 is maintained in substantial contact with sprocket 905. Belt 906 may be a "Gilmer" belt, poly chain, or any other engageable surface. Preferably, toothed or geared surfaces are used with belt 906 and sprocket 905 to maintain a known relationship between the rotation of sprocket 905 and the rotation of cylinder 101. When such a known relationship is maintained, an open loop control system may be used to control the position of cylinder 101. Alternatively, a non-indexed arrangement, such as a non-toothed belt, may be used if a closed loop control system is provided. A closed loop control system senses the actual position of cylinder 101 and provides feedback to the motor driving sprocket 905 to attain the desired position of cylinder 101. If belt 906 is continuous and if it maintains sufficient friction with cylinder 101, mounts 908 may be omitted.

Another alternate embodiment of the drive actuator is illustrated in FIG. 3. The pneumatic actuator 313, illustrated in FIG. 3, is a lateral actuator, extending horizontally underneath the cylindrical member 101. Roll is controlled by the relative length of the pneumatic actuator 313 to prevent tipping beyond a certain distance in order to safeguard against the visitors 109 falling out of the cylindrical member 101 while it is in motion. The pneumatic actuator 313 is a double-acting pneumatic actuator which includes a flow control valve 321 that controls movement of high-pressure air received through hoses 323 from the pneumatic pump, not shown. The pneumatic pump delivers high pressure air through hoses 323 to the pneumatic actuator 313 to power it. It is understood in the art that pneumatic actuator 313 can be replaced with a hydraulic actuator, and the high-pressure air used for pneumatic actuator 313 can be replaced with high-pressure hydraulic fluid without departing from the scope of the present invention. It is also understood that pneumatic actuator 313 can be replaced with an electromechanical actuator where neither high-pressure air not high-pressure hydraulic fluid is needed.

The actuator rotates the cylindrical member 101 to either side. This movement produces forces on the viewer 109 that corresponds to the forces that would be experienced if the person were actually in the vehicle executing the maneuvers shown in the image on the projection screen 103. Since the direction of movement may sometimes need to be quickly reversed, the actuator 313 is effective in stabilizing the structure and in providing a smooth motion at all times and particularly during rapid acceleration and deceleration and quick reversal of the movement, providing a moving sensation that greatly enhances the realism of the scene being viewed. For example, when the image simulates a view of a vehicle that is turning to the right, the actuator is operated to tilt the cylindrical member 101 to the left to simulate roll that would result from the vehicle turning to the right.

In order to permit instant coordination of the cylindrical member's 101 movement with the image projected on the rear projection screen 103, instructions for movement of the actuator are provided. Encoder 307 delivers an encoded electrical signal corresponding to the instructions. The electrical signal is delivered to the electrical controls device 305. Electrical controls device 305 delivers the electrical signal to the actuator to control movement of the cylindrical member 101. Electric power for controlling and propelling the cylindrical member 101 may be supplied, for example, through a power cable, not shown, connected to a battery or a generator, not shown.

The electrical controls device 305 delivers the appropriate signals to the actuator. The electrical control device 305 can also be used to control the actuator to return the cylinder 101 to a "rest" (level) position when power is lost or when an emergency stop is engaged.

Figure 4:
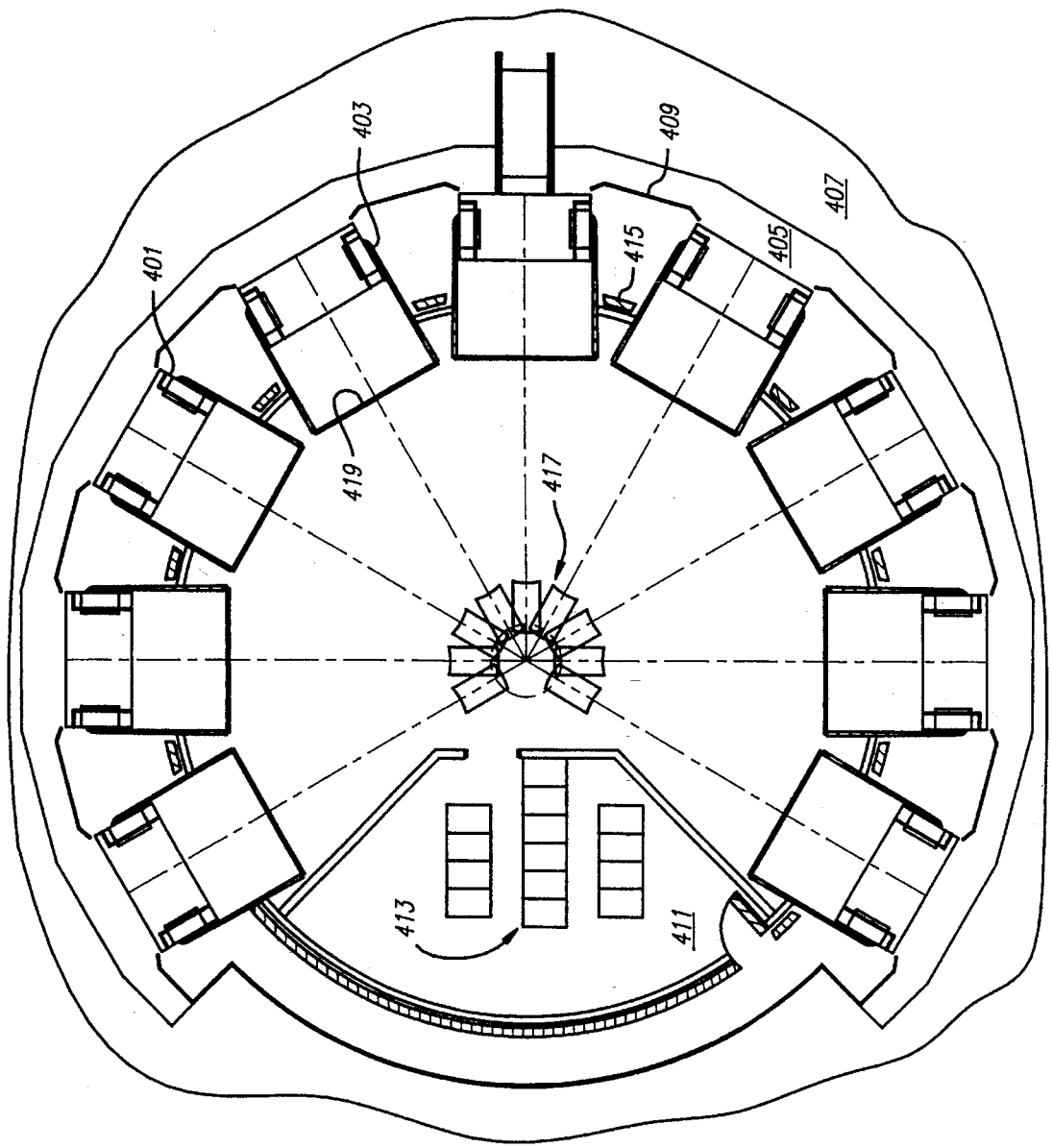
FIG. 4 is a sectional top view of an amusement theater, partially broken away to show details of the construction, in accordance with another embodiment of the present invention.
Figure 5:
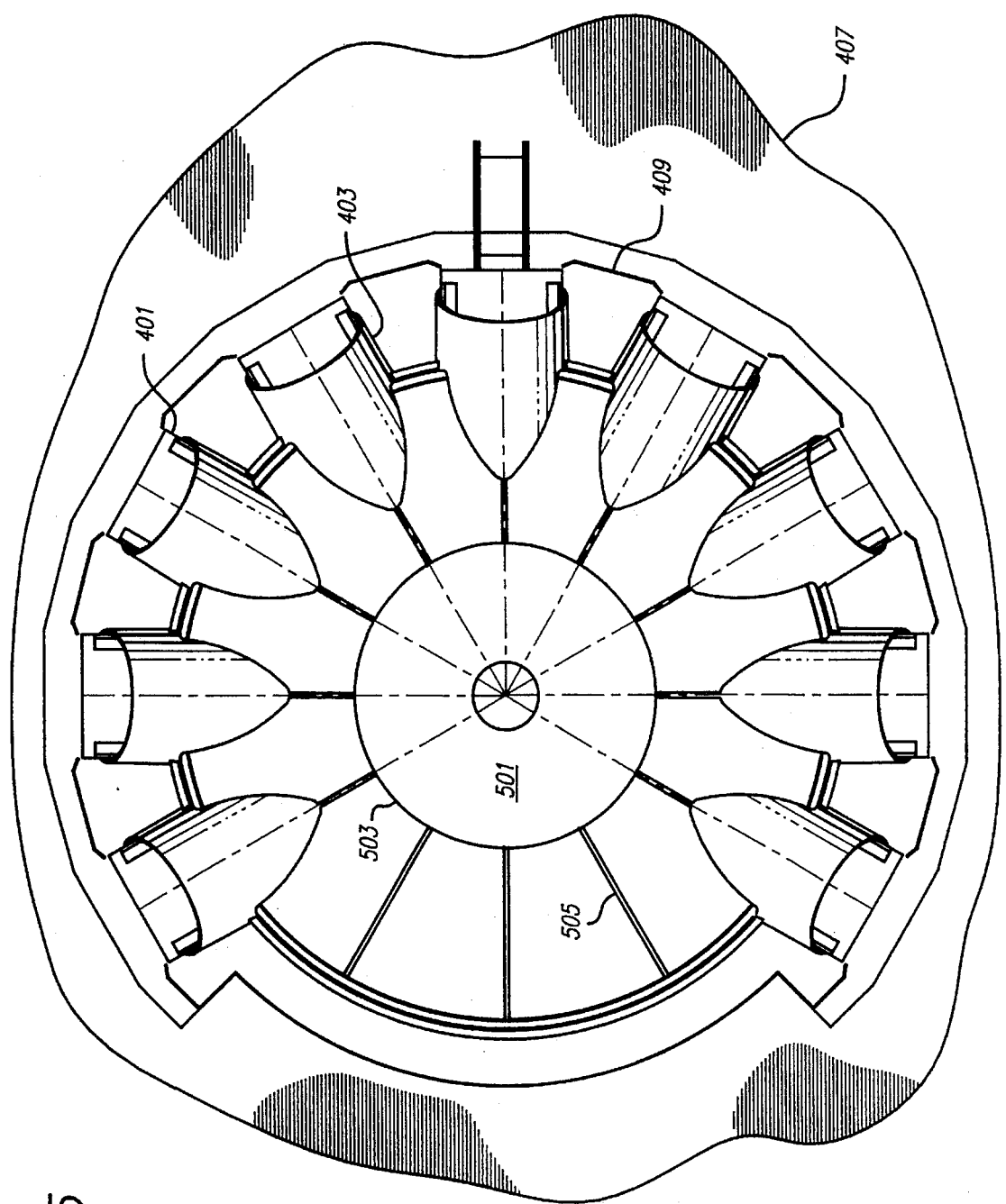
FIG. 5 is a sectional top view of the apparatus of FIG. 4, in accordance with another embodiment of the present invention.

An illustration of another embodiment of the present invention, illustrated in FIGS. 4–9, is an amusement theater with several motion base tubes having rides from the same theme and capable of accommodating a group of people. The theater comprises a round motion base facility containing, for example, nine separate cylindrical motion base tubes 401 encompassed by outer tubes 403, having projection screens 419 at the other end, as shown in FIG. 4. The motion base tubes are similar to the cylindrical member shown in FIGS. 1–3. The facility is placed on the facility floor 407 underneath which there is a facility pit 411 containing mechanical equipment. Around the facility is a facility platform 405 and a guard rail 409. Facility wall 415 is circular in shape with a plurality of motion base tubes 401 protruding from the facility wall 415. Electronic equipment room 413 is placed in the remaining part of the facility. In the middle of the facility, there are nine projectors 417 facing the projection screens 419 of the outer tubes 403 and projecting the image to be viewed by the spectators. Facility roof 501, shown in FIG. 5, is round and covered with a plurality of facility roof panels 503. Neon lights 505 are placed between the roof panels 503.

Figure 6A:
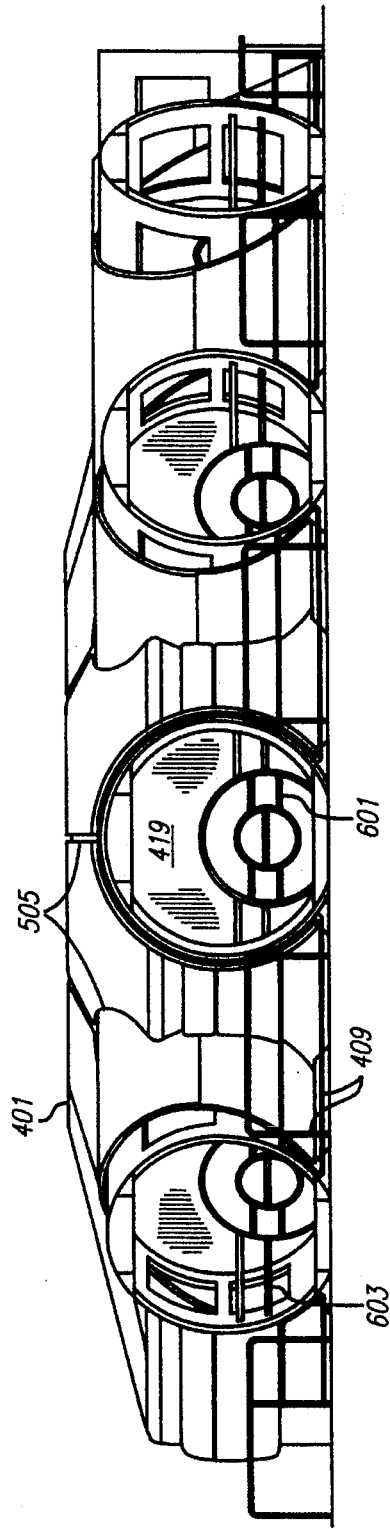
FIGS. 6A, 6B and 6C are sectional side views of the apparatus of FIG. 4, in accordance with another embodiment of the present invention.
Figure 6B:
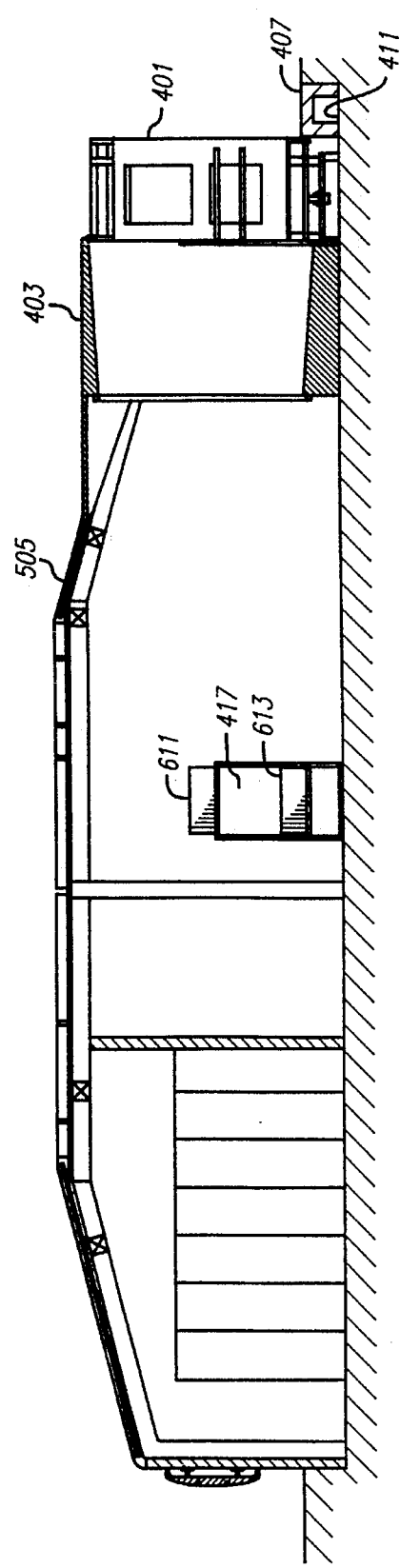
Figure 6C:
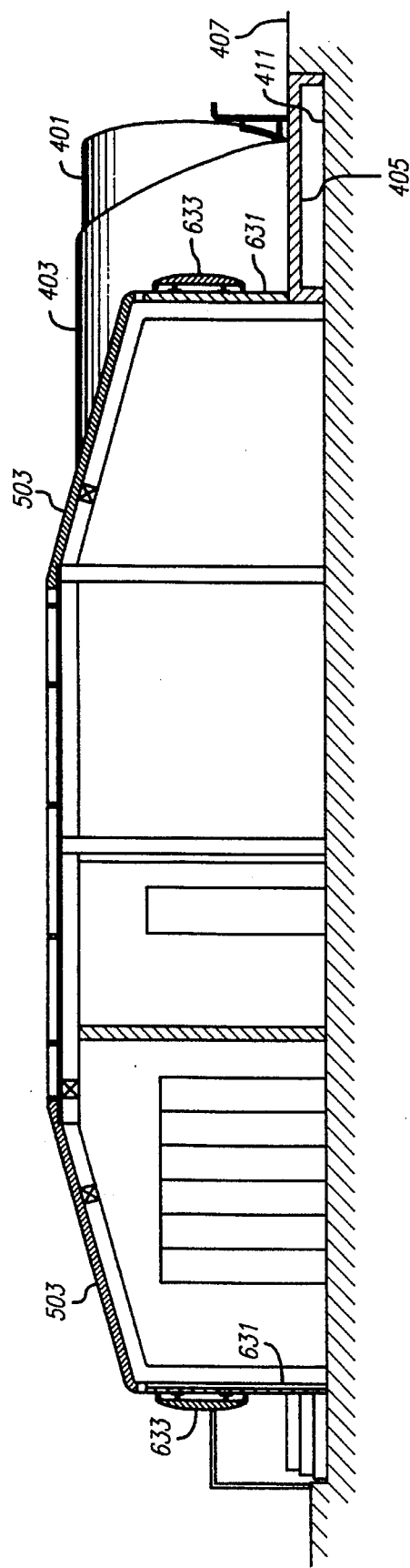

FIG. 6A illustrates several motion base tubes 401 with rear projection screens 419 in the back of the outer tubes 403. Each motion base tube 401 has a circular handrail 601 and four side windows 603. FIG. 6B illustrates the projector 417, in this illustration represented by a projector pair comprising a projector on top stand 611 and a projector on bottom stand 613, for one of the motion base tubes 401, and the projection screen 419 in the back of the outer tube 403. FIG. 6C illustrates facility doors 631, plant-on curved show panels 633 mounted on facility doors 631 and removable facility platform 405 for access under the facility floor 407 and into the facility pit 411, between two of the motion base tubes 401.

Figure 7A:
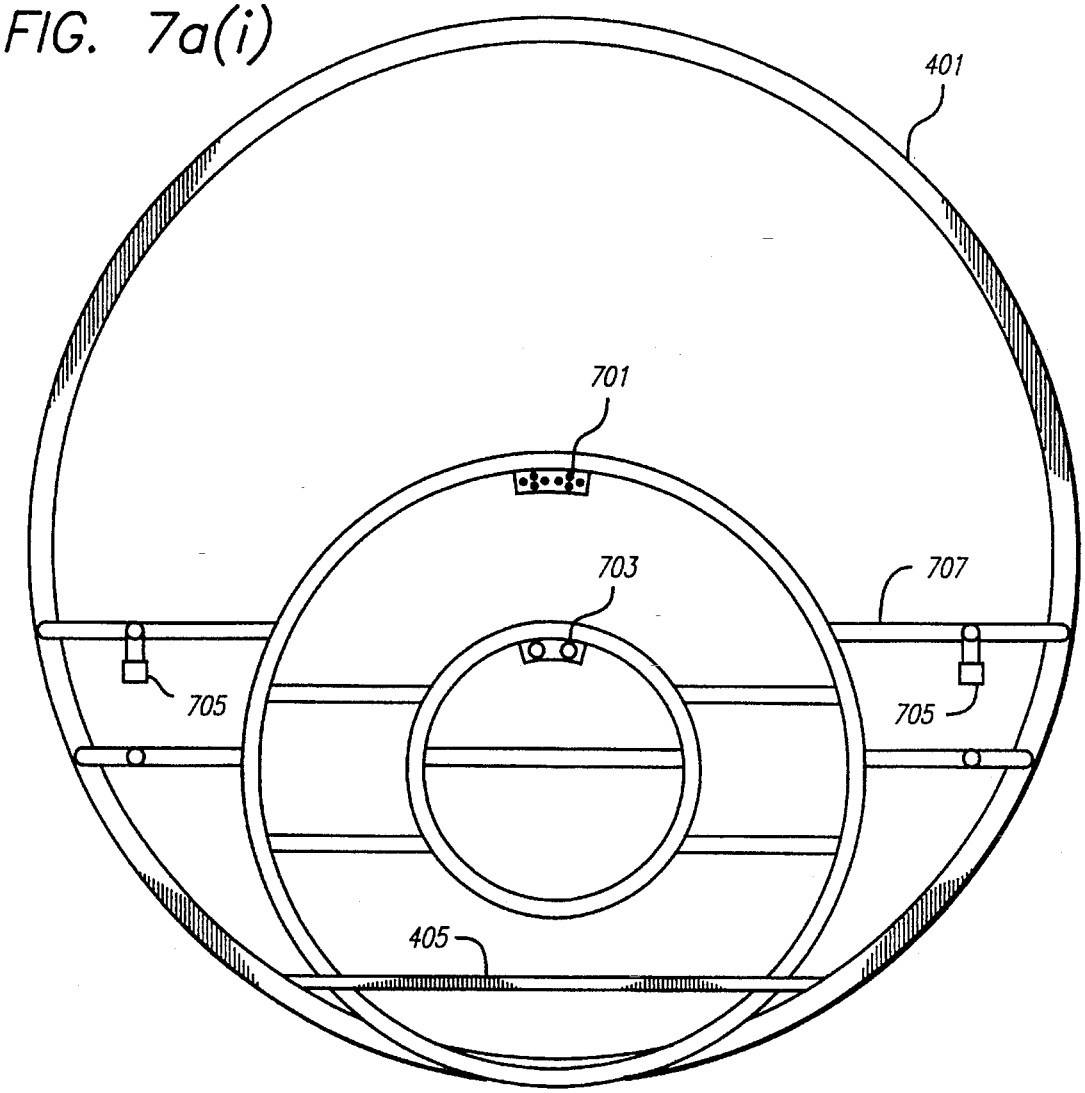
FIGS. 7A (i), 7B and 7C are front elevational views of a portion of the apparatus of FIG. 4, in accordance with another embodiment of the present invention.
Figure 7A:
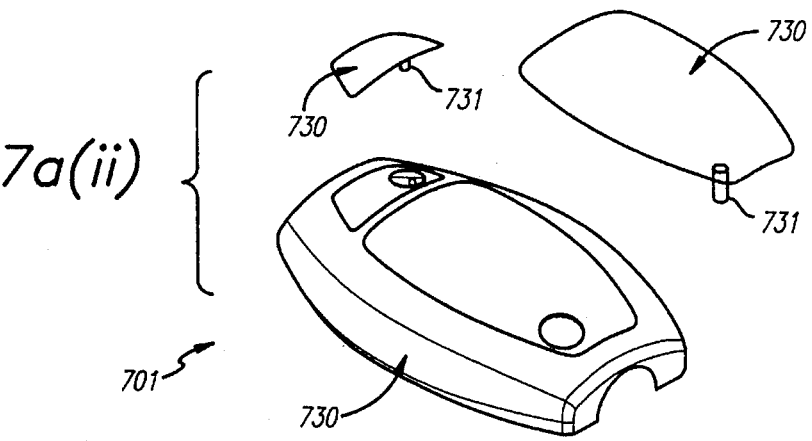

FIG. 7A(i) illustrates one of motion base tubes 401 in a steady position. Each motion base tube 401 has a section 701 which includes a touchplate 730 (shown in FIG. 7A(ii)). In normal operation, while motion base tube 401 is in motion, the spectator has his or her hand on touchplate 730 to allow motion base tube 401 to continue in motion. Thus, as long as the spectator is touching touchplate 730, motion base tube 401 continues in motion. As soon as the spectator is no longer touching touchplate 730, motion base tube 401 stops its motion. Touchplate 730 is also called the "dead man's switch" indicating that in the event of release of pressure by a spectator, motion base tube 401 is stopped. Manifestly, touchplate 730 serves as an aid to avoid accidents. When the spectator is tipped off balance or otherwise wishes to stop motion of motion base tube 401, the spectator does not need to look for a switch or button to stop motion of motion base tube 401. With the aid of touchplate 730 motion base tube 401 stops when the spectator is not consciously directing motion base tube 401 to continue its motion.

Start and Close Caption buttons 703 are used by the spectator to start and stop the motion of the motion base tube 401 and the image, not shown, projected on the rear projection screen 419. When the emergency stop button is activated, the electrical control device 305 prevents motion of the motion base tube.

Figure 7B:
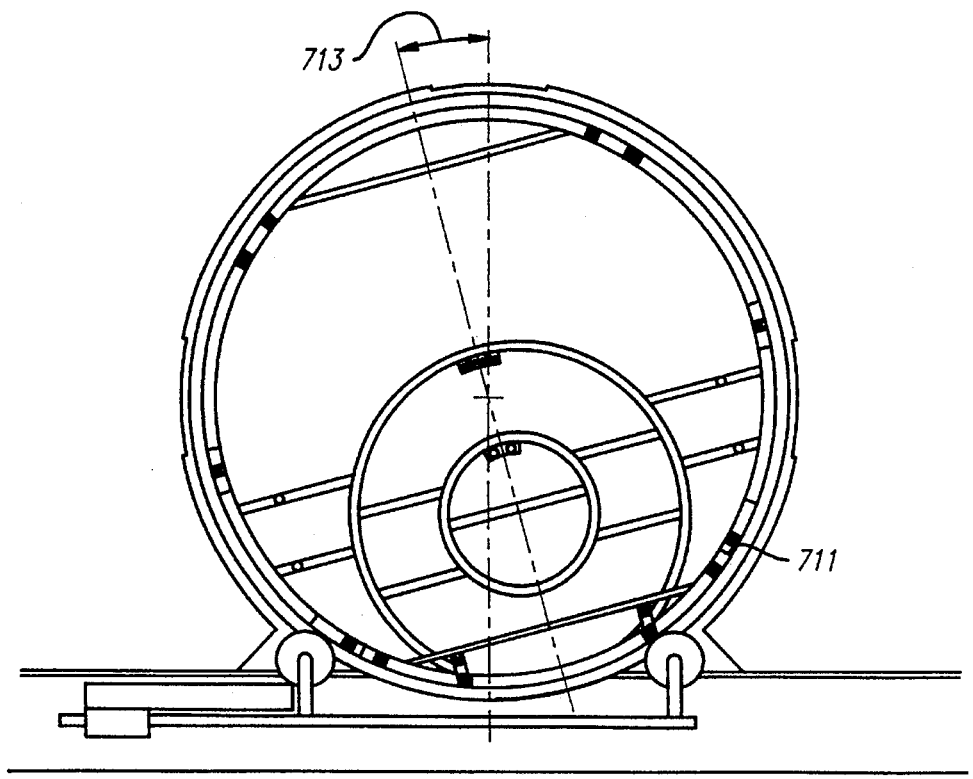
FIGS. 7D, 7E and 7F are front, side and top view of a portion of the apparatus of FIG. 4, in accordance with another embodiment of the present invention.
Figure 7C:
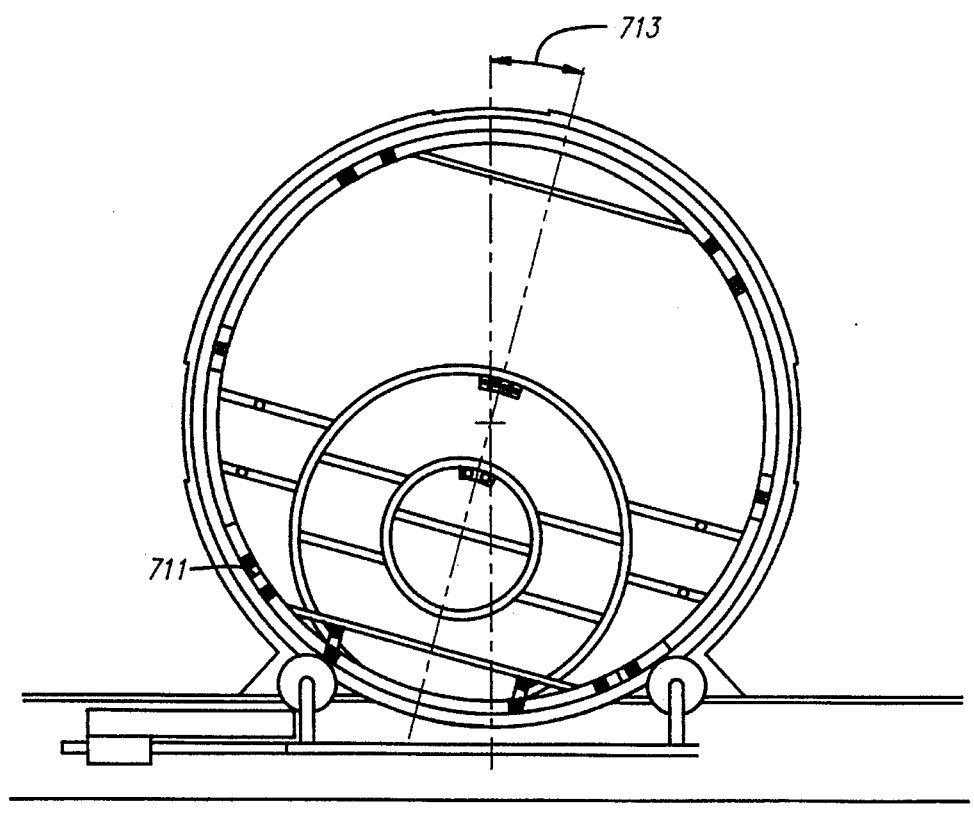

FIG. 7B illustrates the motion base tube 401 tilted to the left. A roller/support stop point 711 is placed on the motion base tube 401 to ensure the range of the rolling movement to the left does not exceed, in the preferred embodiment, fifteen degrees. (In other embodiments, different ranges of motion are permitted). FIG. 7C illustrates the motion base tube 401 tilted to the right, and the roller/support stop point 711, placed on the motion base tube 401, to limit the range of the rolling movement to the right to fifteen degrees in the preferred embodiment. In addition, in the preferred embodiment, the rate of rotation does not exceed 15 degrees of rotation per second.

Figure 7D:
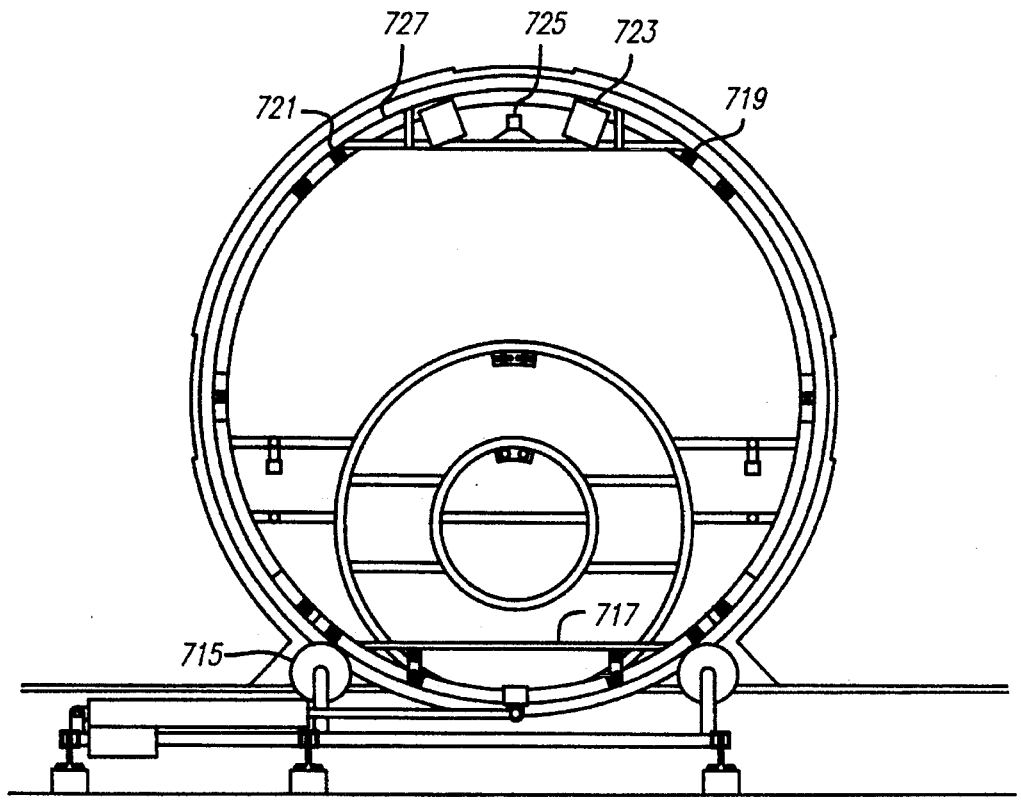
Figure 7F:
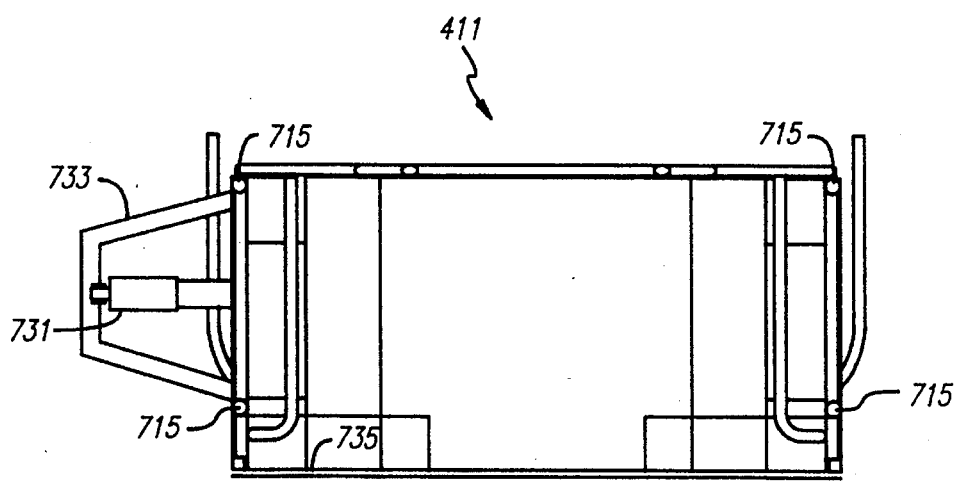
Figure 7E:
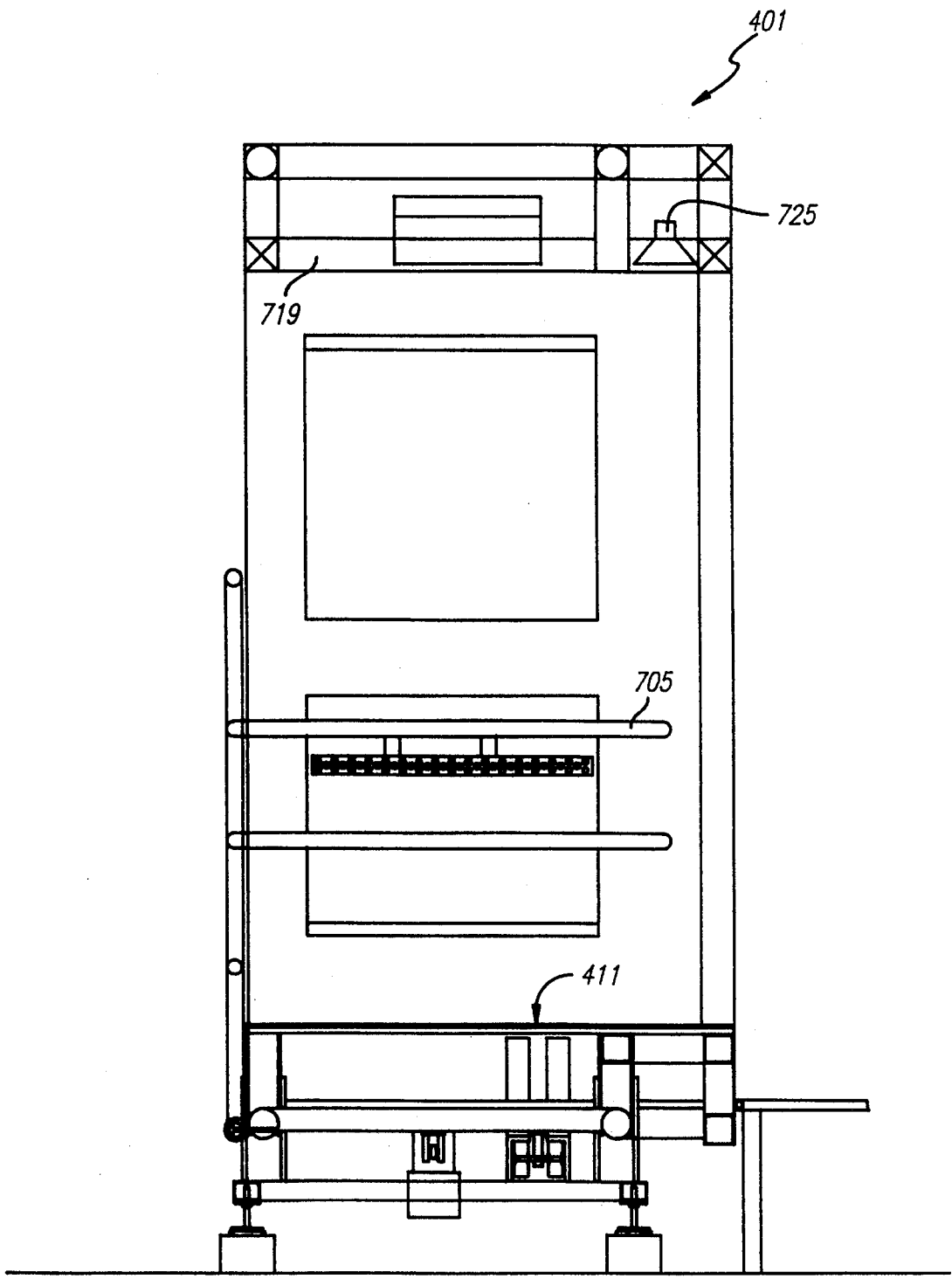

FIG. 7D illustrates the motion base tube 401 mounted on the four load wheels 715. The motion base tube platform floor 717 is bolted by steel framing 801, shown in FIG. 8A, and covered with non-skid flooring. The motion base tube top platform 719 is bolted with steel rods 721 and used for storage of audio speakers 723, load/unload lamp 725 and corner safety lighting 727. FIG. 7E shows a side view of the motion base tube 401 with the "E" stop bar 705 and the flooring pit 411, shown in detail in FIG. 8C. FIG. 7F illustrates the top view inside the flooring pit 411 of one of the motion base tubes 401. Some of the mechanical components presented in this illustration of the preferred embodiment are an actuator 731, an actuator frame 733 and an actuator safety light 735.

Figure 8C:
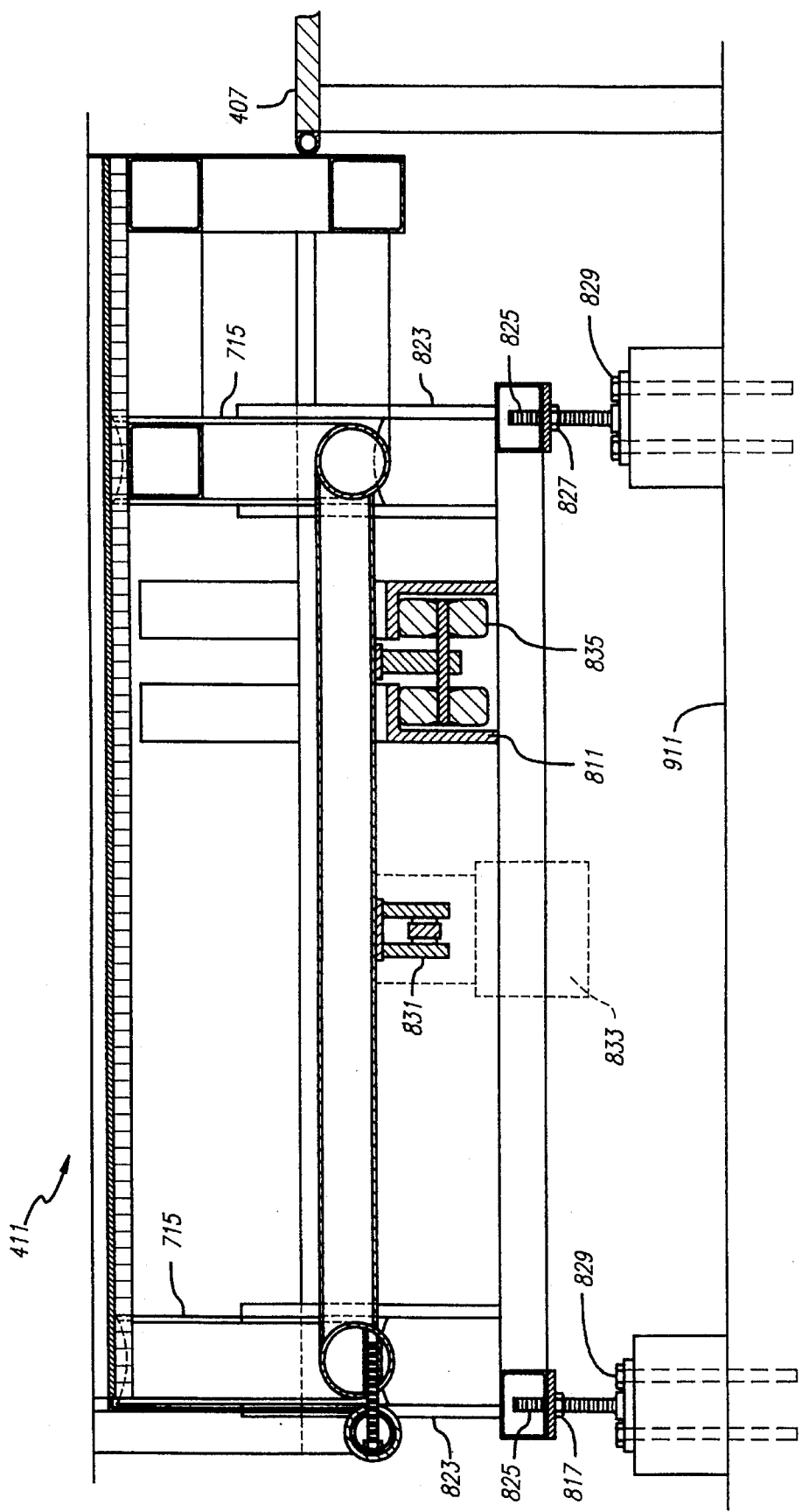

FIG. 8A illustrates a partial view of the motion base tube platform floor 717 with steel rods 721 for support. Motion base tube platform floor 717 has safety light 801 on each side of the motion base tube platform floor 717. FIG. 8B illustrates the motion base tube top platform 719 with safety lighting 727. FIG. 8C illustrates a side view under the motion base tube platform floor 717. Two of the four load wheels 715 are shown with load wheel brackets 823, used to facilitate the rolling movement of the motion base tube 401 on the guide track 811 mounted to frame of the motion base tube 401. Each load wheel 715 of the motion base tube 401 is grasped by the guide grove, not shown, of guide track 811. As shown in this drawing, the facility is bolted on facility slab, with bolt 829. A leveling bolt 825 and an adjustment nut 827 are keeping the motion base tube 401 leveled. Under the motion base tube 401, a conventional ball screw actuator 831 placed next to an actuator control box 833 is illustrated. Up-stop rollers 835 with positive up-forces are used under each motion base tube 401 to prevent it from separating from the cradle. Before the visitors exit or and enter the ride, the facility floor 407 is made parallel with the motion base tube platform floor 717, as a precaution.

Figure 9:
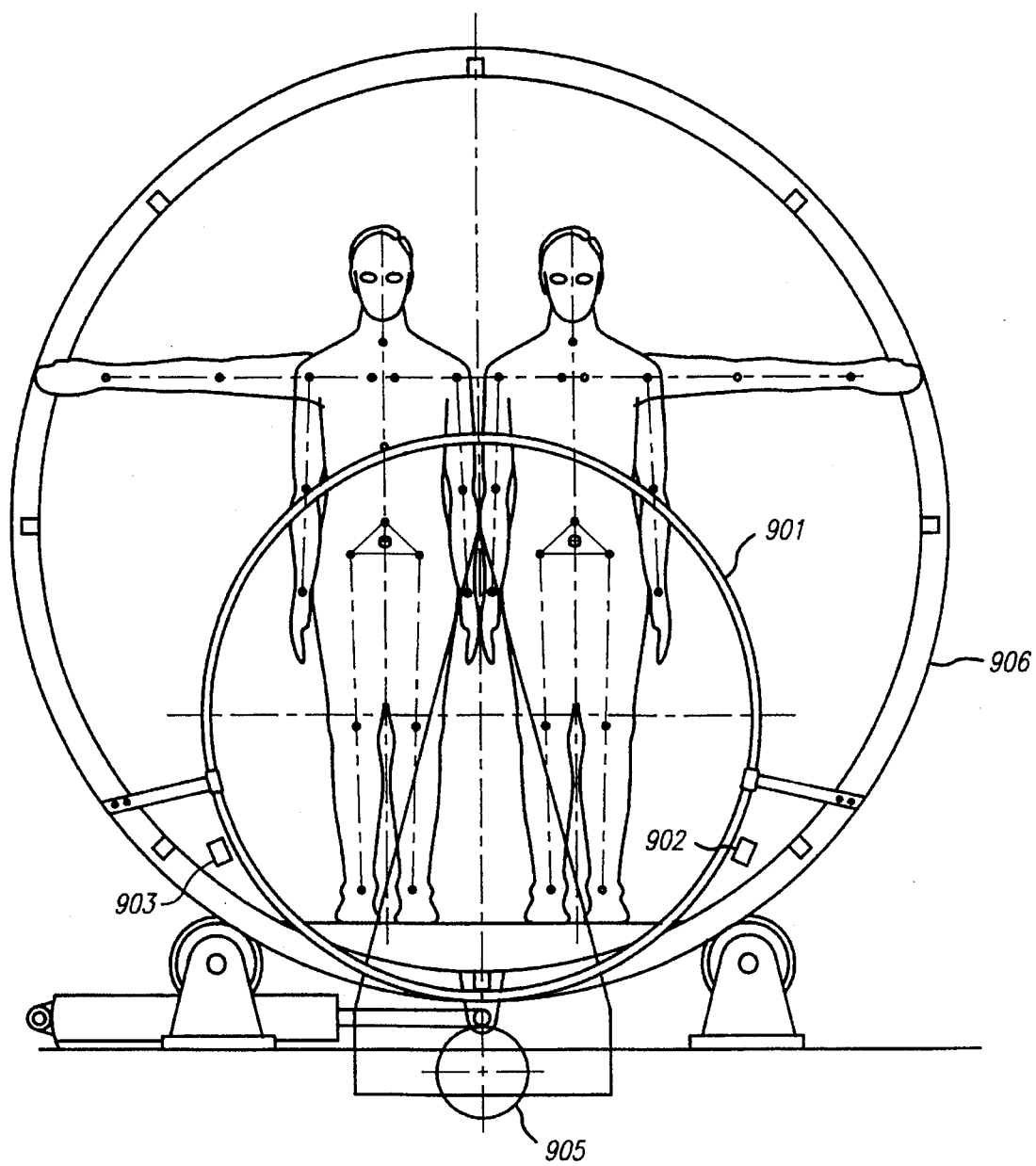
FIG. 9 illustrates an alternate embodiment of the present invention.

An alternate embodiment of the present invention is illustrated in FIG. 9. In this version the device is interactive.

The viewer observes an image and attempts to match roll and turning motions of the image by causing rotation of the motion base tube. This is accomplished by a control ring 901 mounted in the interior of the motion base tube. A pair of potentiometers 902 and 903 are coupled to the control ring and are activated by motion of the control ring. When the control ring is turned, the potentiometers provide signals that indicate direction of travel and speed.

The direction and speed signals are coupled to the electrical controls device 305. The electrical controls device 305 is used to cause the actuator to rotate the motion base tube in the direction and at a rate indicated by the turning of the control ring. As with the preferred embodiment described above, the amount of rotation of the base motion tube is limited by two or more stops.

The electrical controls device 305 may be a processor driven control system or a single purpose controller. The controls device 305 should be capable of converting input signals to drive signals that are outputted to the actuator 313. In addition, the controls device 305 is capable of detecting that the guest's hand is off touchplate 730 (shown in FIG. 7A(ii)). In that case, a warning message informs the guest that placing his or her hand back on the touchplate will cause normal motion to continue. If the guest does not wish to continue, he or she is told to leave his or her hand off the touchplate. After thirty seconds, the cylinder will slowly turn to level and stop. In this manner, controls device 305 detects emergency stop requests by the guest. In one embodiment, the controls device 305 is capable of tracking position and direction of travel of the cylinder.

While the preferred embodiments have been described and illustrated, various modifications and substitutions may be made thereto without departing from the scope of the invention. Accordingly, it should be understood that the present invention has been described by way of illustration and not limitation.

What is claimed is:

1. An amusement apparatus for creating an illusion of travel in a preprogrammed environment comprising:

a cylindrical member;

actuating means operatively associated with said cylindrical member for imparting motion to said cylindrical member to cause roll;

means for independently limiting the extend or foll movement of said cylindrical member;

a tube positioned after said cylindrical member, having a circular enclosure, adapted to register with said cylindrical member and oriented with a direction of observation;

a screen disposed in rear of said tube;

an image generator to simulate the view during the ride or flight;

means for projecting an image from said image generator to said screen, viewable by looking at said screen and representing a view from a moving vehicle; and drive means for changing position of said cylindrical member in synchronism with changes in said moving image, in a manner that generates resulting physical forces on occupants of said cylindrical member simulating at least some of the forces that would be applied to them in actual motion of a frame depicted by said image, creating the illusion of flying or riding.

2. The apparatus of claim 1, wherein said cylindrical member comprises a platform and is adapted to carry said occupants thereon.

3. The apparatus of claim 1, wherein said actuating means further comprises drive support means providing for limited side-to-side rolling movement of said cylindrical member with respect to said tube.

4. The apparatus of claim 3, wherein said drive support means are in the form of wheels.

5. The apparatus of claim 1, wherein said actuating means further comprises reversible drive means for rollably moving said cylindrical member independently of said tube and limiting said extent of roll movement.

6. The apparatus of claim 5, wherein said reversible drive means are in the form of wheels.

7. The apparatus of claim 1, wherein said actuating means further comprises an electric motor positioned adjacent said cylindrical member and engaging a track coupled to said cylindrical member.

8. The apparatus of claim 1 further including electronic circuit means for controlling said actuating means to coordinate the movements of said cylindrical member with said image.

9. The apparatus of claim 1, wherein said tube further comprises light means and means for interrupting light means controlled by the movement of said cylindrical member.

\* \* \* \* \*